W. L. PATTERSON.
OPERATING TABLE ILLUMINATOR.
APPLICATION FILED APR. 5, 1917.
1,277,109.
Patented Aug. 27, 1918.
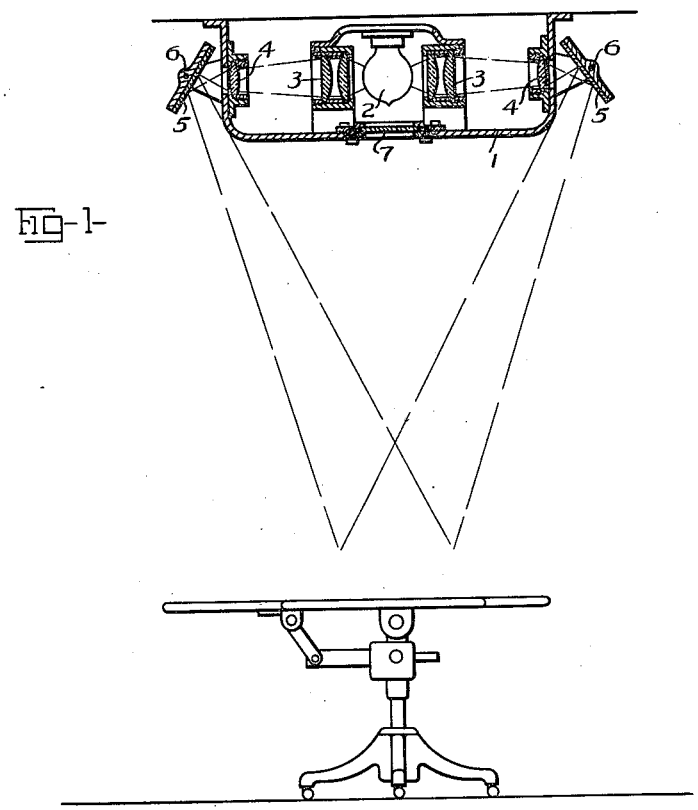
FIG-1-
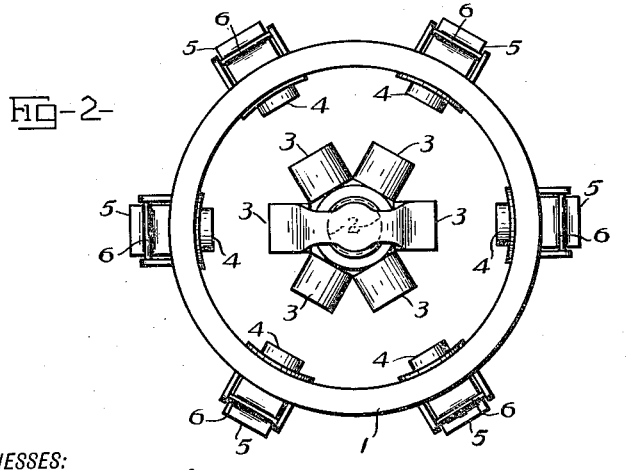
FIG-2-
WITNESSES:
George D. Powell
INVENTOR
William L. Patterson
BY
his ATTORNEYS

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

OPERATING-TABLE ILLUMINATOR.

1,277,109.     Specification of Letters Patent.     Patented Aug. 27, 1918.

Application filed April 5, 1917. Serial No. 159,848.

*To all whom it may concern:*

Be it known that I, WILLIAM L. PATTERSON, a citizen of the United States, residing at Rochester, in the county of Monroe, State of New York, have invented certain new and useful Improvements in Operating-Table Illuminators; and I do declare the following to be a full, clear, and exact description of the same, reference being had to the accompanying drawings, forming a part of this specification, and to the figures of reference marked thereon.

My invention relates to light projectors for illuminating a restricted area more or less remote from the apparatus and more particularly relates to an illuminator especially adapted to illuminate an object or area that is being operated or worked upon.

In order to ideally illuminate the field of operation of a patient on an operating table, an illumination should be afforded in such a manner that the temperature of the illuminated field will not be appreciably raised, that the source of illumination shall not cause or gather dust which if permitted may infect the field of operation, and that the illumination must be of such a character that a surgeon handling the instruments or any other object interposed between the source of illumination and the field of operation will cast no shadow. Up to the present time a skylight in the ceiling of an operation room over the operating table has met the requirements for illuminating the field of operation whenever adequate daylight has been available. An object of the present invention is to provide an illuminator for artificially illuminating the field of operation, or any other area to be illuminated and having equally exacting requirements, and which will be convenient, simple, reliable and efficient in use, and that will be compact and comparatively inexpensive in construction.

In the drawings:

Figure 1 is an elevation showing the illumination apparatus in vertical section and attached to the ceiling and showing the manner in which the field of operation above an operating table is illuminated. Fig. 2 is a top plan view of the illuminator.

The illuminator is preferably made in a single compact unit that is adapted to be either built on or temporarily attached to the ceiling of an operating room and is preferably placed adjacent the room skylight under which operations are usually performed when daylight is favorable. The apparatus as thus used is adapted to project a beam of light downwardly for providing shadow proof illumination for the field of operation of a patient placed on the operating table immediately beneath it. Thus when daylight illumination is insufficient the field of operation may be artificially illuminated with an equal degree of convenience and satisfaction afforded by daylight.

In carrying out my invention I provide a dust proof and water tight casing 1 in the center of which is mounted an incandescent light bulb 2 surrounded by a plurality of projecting lens systems preferably six in number, each arranged with its axis extending radially outward from the light source as best shown in Fig. 2. These projecting lens systems each comprises a pair of condensing lenses 3 adapted to collect approximately a sixty degree cone of light rays emanated laterally by the light bulb 2 and direct them into an objective 4, arranged farther along the optical axis of the condensing lenses. Each of the objectives 4 projects a divergent beam of light on to a reflector 5, that is one of a circular series of reflectors, each reflector of the series being positioned in the path of light of one of the projecting lens systems to intercept the beam of light emerging therefrom and bend it inward and downward, so that all of the beams fall from different directions on to a single area below, in which is placed the field to be illuminated.

The field to be illuminated is preferably situated directly under, or near a spot directly under, the center of the casing 1 as shown in Fig. 1, and the reflectors 5 which may be adjusted about their axes 6 for centering the various light beams upon a single area constituting the field to be illuminated, are located at points on the circumference of a circle of comparatively large diameter, say five feet. The light beams reflected down upon the field to be illuminated are thus angularly incident upon this field from six different sides at once and thus since it is impossible under ordinary operating or working conditions, unless deliberately attempted, to intercept all six beams at once, no pronounced shadow will result from placing or holding a surgical instrument or other opaque object over the illuminated field, since only a relatively small portion of the light of the beams will be obstructed and the remaining light surging in from all around will dissolve the shadow that otherwise might result.

A removable ground glass window 7 directly below the light bulb 2, has sufficient diameter to allow insertion of the light bulb and provides for convenient substitution of a new light bulb for one burned out. This ground glass window also serves for generally illuminating with a subdued light that portion of the operating room adjacent the illuminated field of operation.

With an illuminator of the character described many very desirable features necessary in illuminating a field of operation are obtained. One feature is the large proportion of the total spherical candle power of the light source that is used, comparatively little light being wasted. Another feature is the fact that the temperature of the operating field is not noticeably raised even after protracted illumination owing to the efficient use of the light source permitting the use of beams of divergent light obtained by the optical systems of my illuminator. A further great advantage is that the divergent light beam from each individual lens system and coacting reflector falls upon and spreads over the entire area of the operating field, and as the divergent light beams from all the lens systems and reflectors likewise fall upon and illuminate the same area it is obvious that the illumination of the operating field is most brilliant and effective. All danger of falling of dirt or other foreign matter from the illuminator upon the field of operation, and which if permitted might result in infection of a patient, also is overcome owing to the elements of the illuminator being housed within a casing having an outer surface so smooth and regular that dust and dirt will not collect on it. The apparatus is very easily cleaned and sterilized since it may be washed and sprayed without damaging any of its parts because all delicate parts are inclosed within a water tight casing.

Having thus described my invention, what I claim and desire to secure by Letters Patent of the United States is:

In an illuminator, the combination with a dust and fluid tight casing having a lower wall and a connected marginal wall, of a light source mounted within said casing, a plurality of projecting lens systems arranged within the casing around the light source, each lens system being in position to project a beam of light radially outward, and a plurality of reflectors arranged outside the casing and adapted to reflect all of the beams of light emitted by the projecting lens systems on to a common area to be illuminated; said lower wall of the casing having an opening normally closed by translucent material and located under the light source and through which opening access may be had to the light bulb and through which translucent material a beam of light emitted directly from the light source may pass to assist in illuminating the area adjacent the field upon which the projected light beams are centered.

WILLIAM L. PATTERSON.